(12) United States Patent
Shen et al.

(10) Patent No.: US 9,362,964 B2
(45) Date of Patent: Jun. 7, 2016

(54) RECEIVER ARCHITECTURE FOR DUAL RECEIVER SIGNAL LEVEL AND INTERFERENCE DETECTION IN MICROWAVE DIGITAL RADIO APPLICATIONS

(71) Applicant: ZTE (USA) INC., Richardson, TX (US)

(72) Inventors: Ying Shen, Chapel Hill, NC (US); Thanh Nguyen, Cary, NC (US); Aleksandr Semenyshev, Apex, NC (US); Shawn Walsh, Cary, NC (US); William Schmid, Holy Spring, NC (US)

(73) Assignee: ZTE (USA) INC., Austin, TX (US)

( * ) Notice: Subject to any disclaimer, the term of this patent is extended or adjusted under 35 U.S.C. 154(b) by 0 days.

(21) Appl. No.: 14/386,117

(22) PCT Filed: Apr. 29, 2013

(86) PCT No.: PCT/US2013/038666
§ 371 (c)(1),
(2) Date: Sep. 18, 2014

(87) PCT Pub. No.: WO2013/169514
PCT Pub. Date: Nov. 14, 2013

(65) Prior Publication Data
US 2015/0050903 A1   Feb. 19, 2015

Related U.S. Application Data

(60) Provisional application No. 61/643,774, filed on May 7, 2012.

(51) Int. Cl.
*H04W 72/00* (2009.01)
*H04B 1/10* (2006.01)
*H04B 1/28* (2006.01)

(52) U.S. Cl.
CPC ............... *H04B 1/1027* (2013.01); *H04B 1/28* (2013.01); *H04B 2001/1045* (2013.01)

(58) Field of Classification Search
CPC ... H04B 17/309; H04B 1/1027; H04W 16/14; G01S 11/02; H04N 7/20

USPC ........................................................... 725/73
See application file for complete search history.

(56) References Cited

U.S. PATENT DOCUMENTS

| 7,761,072 | B2 * | 7/2010 | Fielder ..................... G01S 19/21 375/346 |
| 8,055,223 | B2 * | 11/2011 | Handa ..................... H04B 1/109 327/306 |
| 8,498,600 | B2 * | 7/2013 | Chan ..................... H03G 3/3078 455/226.3 |
| 2006/0040630 | A1 | 2/2006 | Mostov et al. |
| 2007/0155348 | A1 | 7/2007 | Razavi et al. |
| 2009/0323780 | A1 | 12/2009 | Lennen |
| 2010/0150284 | A1 | 6/2010 | Fielder et al. |

(Continued)

FOREIGN PATENT DOCUMENTS

| EP | 0459383 A2 | 12/1991 |
| EP | 0696852 A2 | 2/1996 |

(Continued)

OTHER PUBLICATIONS

ZTE (USA) Inc., Communication Pursuant to Rules 161(2) and 162 EPC, EP13788407.8, Feb. 4, 2015, 3 pgs.

(Continued)

*Primary Examiner* — Sonny Trinh
(74) *Attorney, Agent, or Firm* — Morgan, Lewis & Bockius LLP

(57) ABSTRACT

A microwave radio receiver includes a first down-converter, a second down-converter, and a combined receiver signal level (RSL) and interference detector. The first down-converter is configured to convert a RF signal into a first IF signal. The second down-converter is configured to convert the first IF signal into a second IF signal. The combined RSL and interference detector is configured to determine one or more RSLs and generate an interference indicator based on the first IF signal from the first down-converter and a control signal from the second down-converter.

19 Claims, 5 Drawing Sheets

(56) References Cited

U.S. PATENT DOCUMENTS

| | | |
|---|---|---|
| 2011/0117870 A1 | 5/2011 | Pera et al. |
| 2012/0034894 A1 | 2/2012 | Chan et al. |
| 2013/0003902 A1 | 1/2013 | Kawai et al. |

FOREIGN PATENT DOCUMENTS

| | | |
|---|---|---|
| EP | 0913934 A2 | 5/1999 |
| EP | 1398930 A1 | 3/2004 |
| JP | H0879110 A | 3/1996 |
| WO | WO 2011/151860 A1 | 12/2011 |

OTHER PUBLICATIONS

ZTE (USA) INC., International Preliminary Report on Patentability, PCT/US2013/038666, Nov. 11, 2014, 6 pgs.

ZTE (USA) INC., International Search Report and Written Opinion, PCT/US2013/038666, Sep. 16, 2013, 8 pgs.

ZTE (USA) INC., Extended European Search Report, EP13788407.8, Jan. 20, 2016, 8 pgs.

\* cited by examiner

RECEIVER ARCHITECTURE FOR DUAL RECEIVER SIGNAL LEVEL AND INTERFERENCE DETECTION IN MICROWAVE DIGITAL RADIO APPLICATIONS

CROSS REFERENCE TO RELATED APPLICATIONS

This Application is a United States National Stage Application filed under 35 U.S.C. §371 of PCT Patent Application Serial No. PCT/US2013/038666 filed on Apr. 29, 2013, which claims the benefit of and priority to U.S. Provisional Patent Application No. 61/643,774 filed on May 7, 2012, which is hereby incorporated by reference in its entirety.

TECHNICAL FIELD

The presented invention relates to microwave radio communications and, in particular, to a receiver architecture for dual receiver signal level (RSL) and interference detection in microwave digital radio applications.

BACKGROUND

Microwave radio applications operate in an electromagnetic (EM) open environment that includes many other microwave radio-frequency signals. A particular application operating in such environment needs to work appropriately even when there is certain co-channel, adjunct-channel or continuous-wave (CW) interference. The rollout of 4G and LTE mobile networks means that the open environment is getting crowded with more and more microwave signals. As such, a microwave radio application (e.g., a microwave receiver) is required to detect not only the desired signal level but also the co-channel or adjunct-channel interference.

SUMMARY

In accordance with some implementations, a microwave radio receiver includes a first down-converter, a second down-converter, and a combined receiver signal level (RSL) and interference detector. The first down-converter is configured to convert a RF signal into a first IF signal. The second down-converter is configured to convert the first IF signal into a second IF signal. The combined RSL and interference detector is configured to determine one or more RSLs and generate an interference indicator based on the first IF signal from the first down-converter and a control signal from the second down-converter.

In accordance with some implementations, the first down-converter further includes a mixer and a local oscillator, and the mixer is configured to convert the RF signal into the first IF signal under the control of the local oscillator. The RF signal is pre-processed by one or more amplifiers and one or more filters before it reaches the mixer. The local oscillator is configured to generate a control signal and the control signal is pre-processed by one or more multipliers and one or more amplifiers and one or more filters before it reaches the mixer.

In accordance with some implementations, the second down-converter further includes a mixer and a local oscillator, and the mixer is configured to convert the first IF signal into the second IF signal under the control of the local oscillator. The first IF signal is pre-processed by one or more amplifiers and one or more filters before it reaches the mixer. The local oscillator is configured to generate a control signal and the control signal is pre-processed by one or more amplifiers before it reaches the mixer. The control signal provided to the combined RSL and interference detector is an amplified version of the control signal generated by the local oscillator.

In accordance with some implementations, the combined RSL and interference detector further includes a mixer, a narrow-bandwidth RSL filter, and a wide-bandwidth RSL filter. The narrow-bandwidth RSL filter has a bandwidth of approximately 5 MHz and the wide-bandwidth RSL filter has a bandwidth of approximately 56 MHz, respectively. The mixer is configured to convert the first IF signal into a third IF signal in accordance with the control signal from the second down-converter and feed the third IF signal to the narrow-bandwidth RSL filter and wide-bandwidth RSL filter, respectively.

In accordance with some implementations, the combined RSL and interference detector further includes a RSL detector, and the RSL detector is configured to switch to connect to the narrow-bandwidth RSL filter and the wide-bandwidth RSL filter, respectively, according to a predefined schedule. The RSL detector is configured to determine a first receiver signal level when it is connected to the narrow-bandwidth RSL filter and determine a second receiver signal level when it is connected to the wide-bandwidth RSL filter. A comparison result of the first receiver signal level and the second receiver signal level is used for generating an interference indicator.

In accordance with some implementations, the RF signal has a frequency ranging from 6 GHz to 42 GHz; the first IF signal has a frequency ranging from 1 GHz to 3 GHz; and the second IF signal has a frequency ranging from 70 MHz to 140 MHz.

BRIEF DESCRIPTION OF THE DRAWINGS

Different aspects of the present invention as well as features and advantages thereof will be more clearly understood hereinafter as a result of a detailed description of embodiments of the present invention when taken in conjunction with the accompanying drawings, which are not necessarily drawn to scale. Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details.

Modern microwave radio applications are required to support various bandwidths. For example, today's point-to-point digital microwave radio applications need to support a channel bandwidth of 7 MHz/14 MHz/28 MHz/56 MHz for international markets and a channel bandwidth of 5 MHz/10 MHz/20 MHz/30 MHz/40 MHz/50 MHz for North American Markets. People have started talking about new channel bandwidths such as 112 MHz, 125 MHz, 250 MHz, and 500 MHz for 60 GHz and E-band. Regardless of the specific channel bandwidth, the receiver signal level (RSL) detection has always been one important parameter for measuring the performance of digital microwave radio applications. In this application, a receiver architecture with the dual accurate RSL and interference detection capability is provided for simplifying the radio installation and the process of debugging radio network problems.

Figure 1:
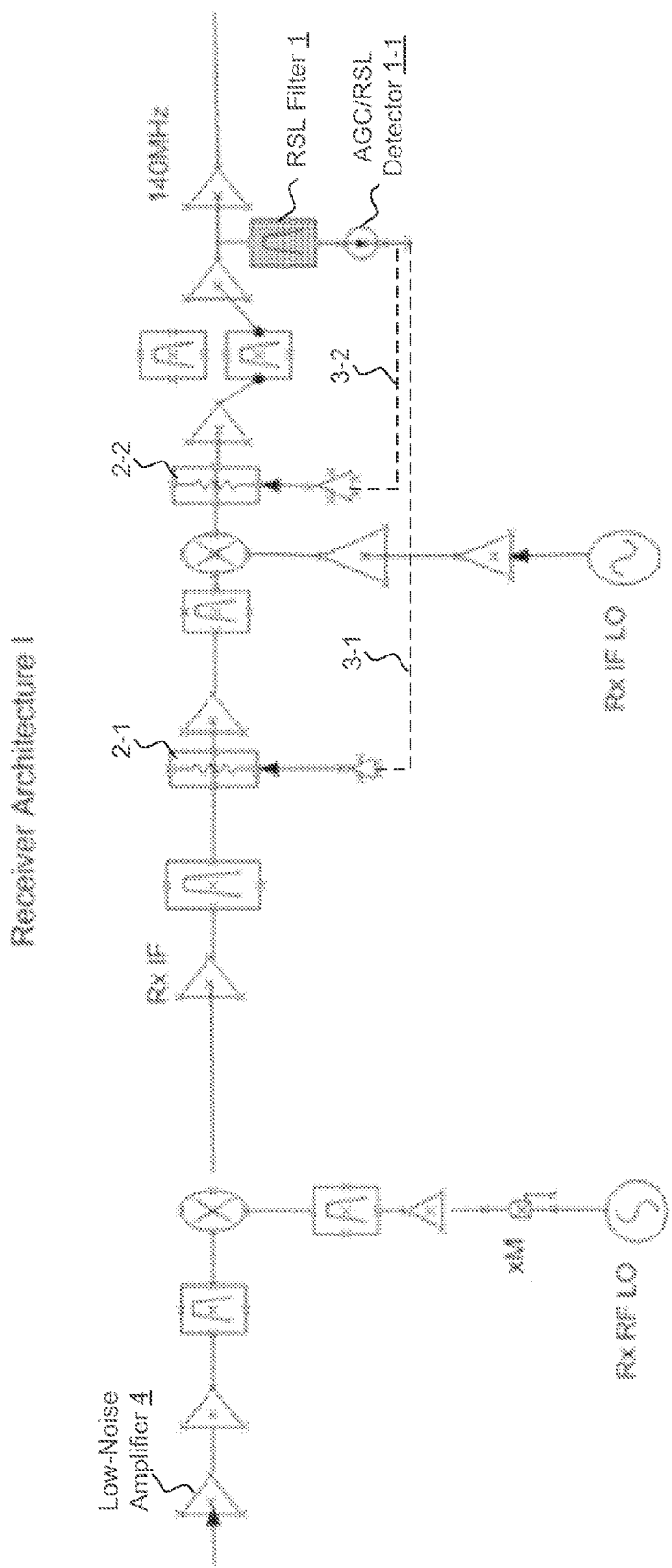
FIG. 1 depicts a block diagram of one conventional microwave receiver architecture.

FIG. 1 depicts a block diagram of one conventional microwave receiver architecture. As shown in the figure, the RSL detection circuitry is combined with an automatic gain control (AGC) detector 1-1. As noted above, a microwave radio application often supports multiple bandwidths, the RSL filter 1 typically chooses the smallest bandwidth of all supported bandwidths. For example, if the microwave radio application needs to support the bandwidth ranging from 5 MHz to 56 MHz, the bandwidth of the RSL filter 1 can be set to 5 MHz. Assuming that the second Rx IF frequency is 70 MHz (not shown in FIG. 1), the relative bandwidth of the RSL filter 1 is at about 7%. But there are three issues with this approach. First, because the RSL filter 1 uses the smallest filter bandwidth, both RSL and AGC detectors need correction factors to compensate for wider bandwidths. This is more difficult for AGC's compensation because it usually involves the variable attenuators 2-1 and 2-2 by operating in a close loop (as represented by the dashed-lines 3-1 and 3-2, respectively). Second, because the RSL detection happens at almost the last stage of the receiver chain, its accuracy is adversely affected by the variations of the other components deployed along the receiver chain starting from the low-noise amplifier 4. Finally, this configuration cannot be used for detecting interference because the RSL filter 1 uses the smallest bandwidth.

Figure 2:
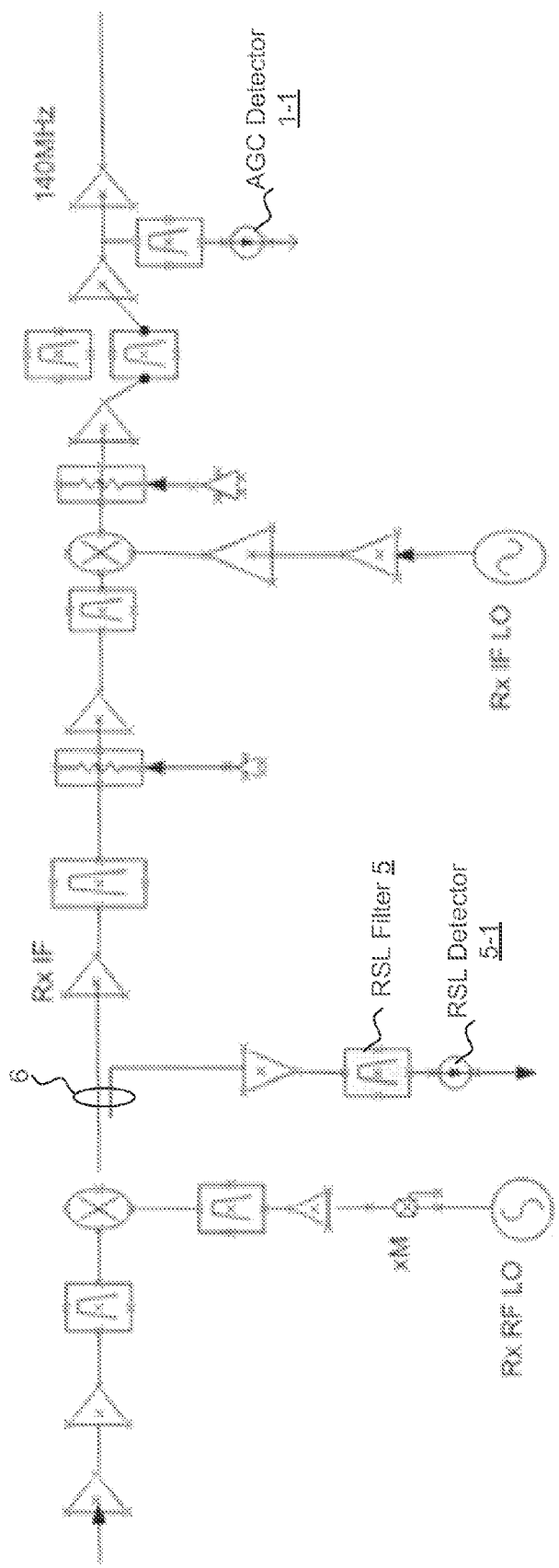
FIG. 2 depicts a block diagram of another conventional microwave receiver architecture.

FIG. 2 depicts a block diagram of another conventional microwave receiver architecture. In this example, the RSL detector 5-1 and the AGC detector 1-1 are separated from each other. As shown in the figure, the RSL filter 5 is located right after the first RF down-conversion with the signal converted from a radio frequency (RF) at 6-42 GHz to an intermediate frequency (IF) at 1-3 GHz. In some implementations, a coupler 6 is used for diverting the first IF signal to the RSL filter 5. The movement of the RSL detection to the front portion of the receiver chain improves the accuracy of the RSL detection. But a downside of such movement is that the RSL detection is done at the first IF of 1-3 GHz. As described above in connection with FIG. 1, the bandwidth of the RSL filter 5 needs to use the smallest bandwidth (e.g., 5 MHz) to guarantee the RSL detection accuracy. In other words, both the technical challenge and the financial cost of manufacturing the RSL filter 5 increase substantially because the relative bandwidth of the RSL filter 5 is less than 0.5%. But if the RSL filter 5 uses the currently largest bandwidth (e.g., 56 MHz), the accuracy of the RSL detection will be compromised by the presence of interference when detecting narrower channels such as the 5/7/10/14/20 MHz channels.

Figure 3:
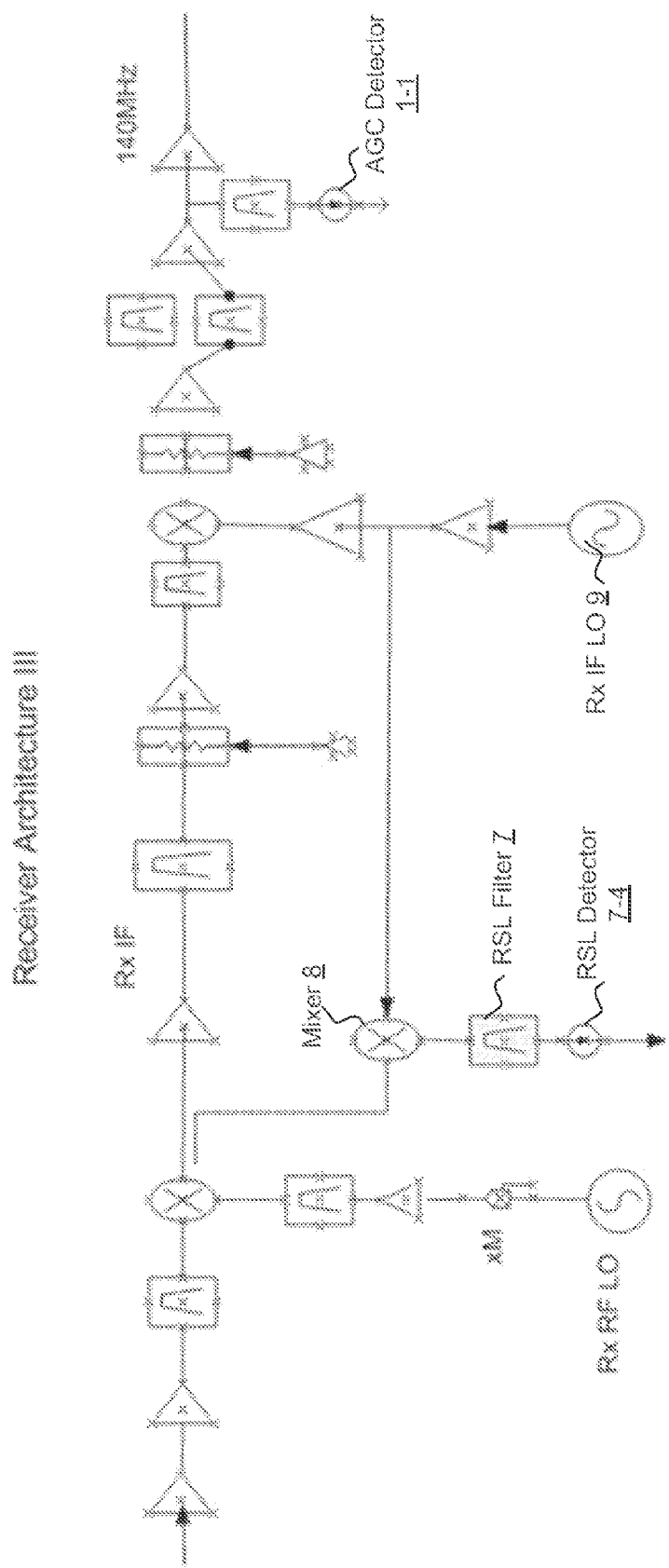
FIG. 3 depicts a block diagram of one microwave receiver architecture according to some embodiments of the present invention.

FIG. 3 depicts a block diagram of one microwave receiver architecture according to some embodiments of the present invention. Like the implementation shown in FIG. 2, the RSL detector 7-4 and the AGC detector 1-1 in this example are still separated apart from each other such that the RSL at the front of the receiver chain. Unlike the one shown in FIG. 2, a mixer 8 is positioned before the RSL filter 7. Under the control of the Rx IF local oscillator (LO) 9, the mixer 8 converts the signal from the first IF of 1-3 GHz to the second IF of 70 MHz or 140 MHz. In other words, the RSL detection is done at the second IF, which is substantially lower than the first IF. With this design, the RSL filter 7 can use the smallest bandwidth (e.g., 5 MHz) with a guaranteed accuracy for all channels except that the RSL filter 7 can no longer detect interference. When installing a microwave radio application, a technician has to turn off the remote transmitter and scan the receiver with different bandwidths to locate potential interference in the network.

Figure 4:
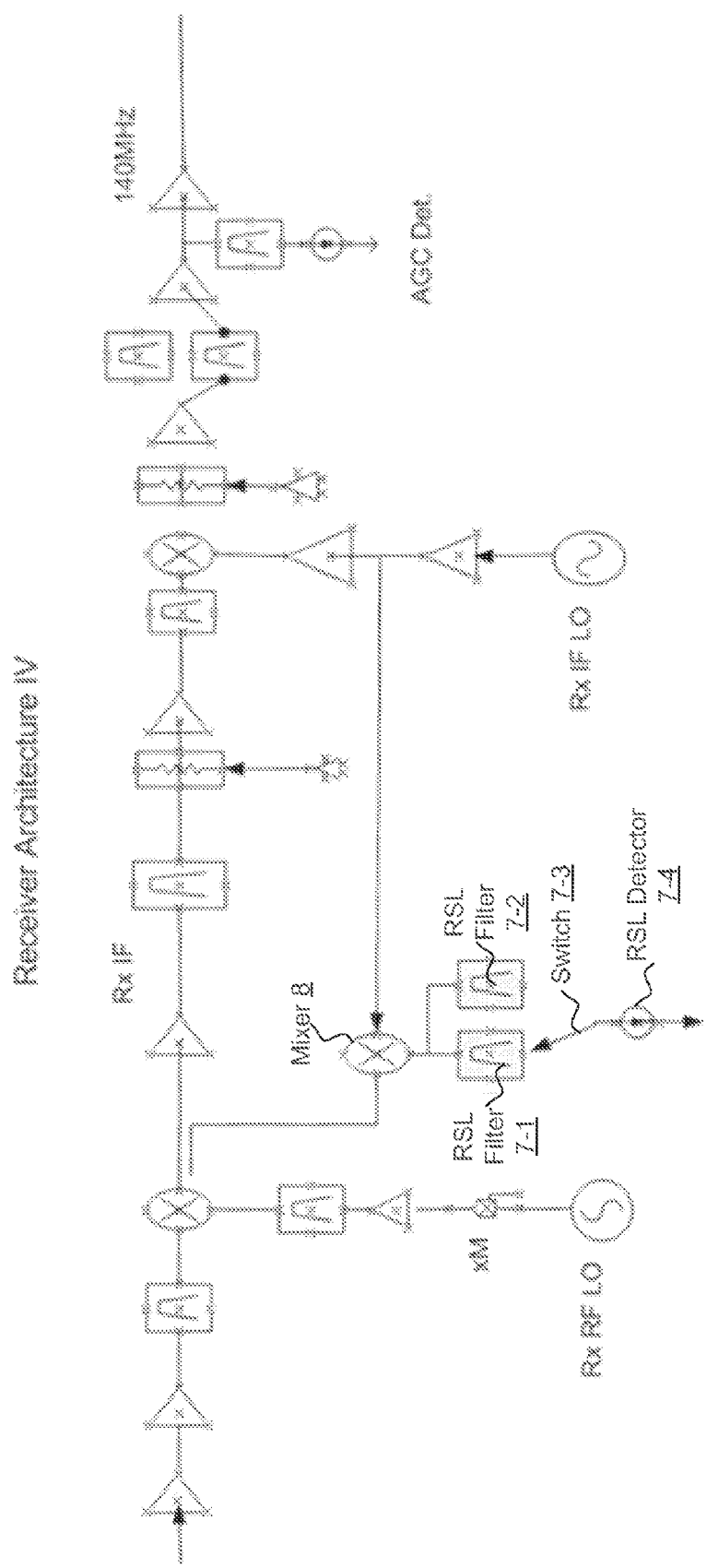
FIG. 4 depicts a block diagram of another microwave receiver architecture according to some embodiments of the present invention.

FIG. 4 depicts a block diagram of another microwave receiver architecture according to some embodiments of the present invention, which can detect both RSL and interference. Compared with the implementations shown in FIG. 3, the RSL filter 7 shown in FIG. 3 is replaced with two RSL filters, RSL filter 7-1 and RSL filter 7-2. In this case, the RSL filter 7-1 uses the smallest channel bandwidth and the RSL filter 7-2 uses the largest channel bandwidth. A switch 7-3 alternately connects one of the two filters to a common RSL detector 7-4. For example, the bandwidth of the RSL filter 7-2 can be set to any one of the bandwidths to detect interference within that bandwidth. The RSL detector 7-4 reports both RSL levels associated with the two filters to a radio management system. Switching between the RSL filter 7-1 and the RSL filter 7-2 can be done automatically by software.

In the implementation depicted by FIG. 4, the RSL detector 7-4 spends most of the time reading the RSL level through the RSL filter 7-1 and reports it to the radio management system as required for regular operation. At predefined times (e.g., once in a second), the RSL detector 7-4 switches to the RSL filter 7-2 for reading the RSL level through the RSL filter 7-2. Note that the predefined times are configurable by an operator within a range of one second to one minute. If the RSL read through the RSL filter 7-2 is higher than the RSL read through the RSL filter 7-1 more than a predefined threshold (e.g. 3 dB), the radio management system may generate an alert or other indicator indicating potential interference.

In the implementation depicted by FIG. 4, the radio management system correlates the reading difference between the two filters with the system bit error rate (BER) to determine whether there is actual interference or not and how serious the interference is. This functionality is used during both the radio application installation and the live operation of the radio application.

Figure 5:
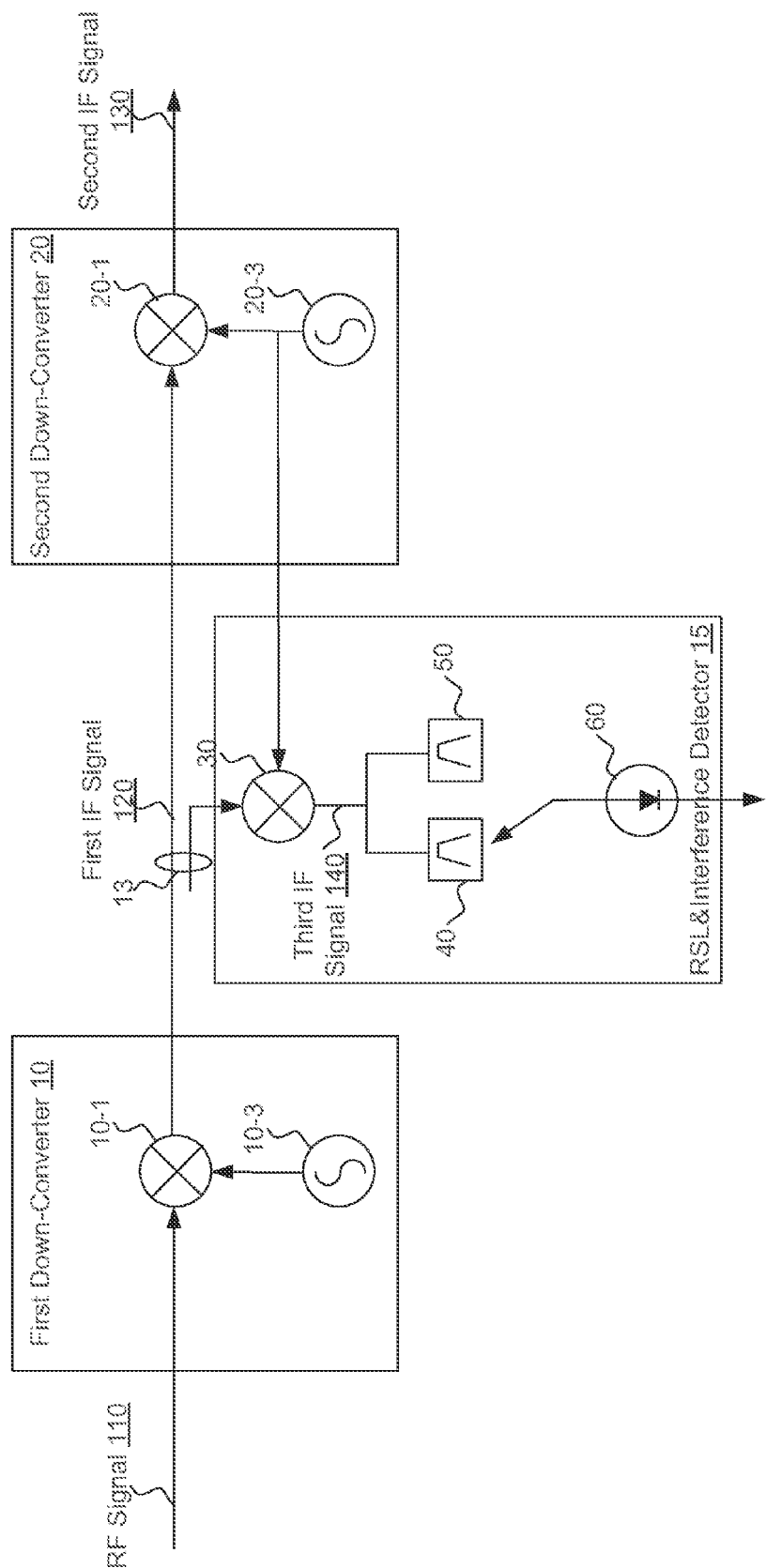
FIG. 5 depicts a simplified block diagram of a microwave receiver architecture according to some embodiments of the present invention.

FIG. 5 depicts a simplified block diagram of a microwave receiver architecture according to some embodiments of the present invention. The receiver architecture includes a first down-converter 10 and a second down-converter 20. The first down-converter 10 converts a RF signal 110 into a first IF signal 120 and the second down-converter 20 then converts the first IF signal 120 into a second IF signal 130.

The first down-converter 10 further includes a mixer 10-1 and a local oscillator 10-3. The mixer 10-1 receives the RF signal 110 (or a processed version of the RF signal 110) and converts it into the first IF signal 120 under the control of the local oscillator 10-3. In some implementations, the RF signal has a frequency of 6-42 GHz and the first IF signal has a frequency of 1-3 GHz. Similarly, the second down-converter 20 further includes a mixer 20-1 and a local oscillator 20-3. The mixer 20-1 receives the first IF signal 120 (or a processed version of the first IF signal 120) and converts it into the second IF signal 130 under the control of the local oscillator 20-3. In some implementations, the second IF signal has a frequency of 70-140 MHz.

A combined RSL and interference detector 15 is located in-between the first down-converter 10 and the second down-converter 20. The combined RSL and interference detector 15 receives the first IF signal 120 and determines the RSL associated with the first IF signal accordingly. In addition, the combined RSL and interference detector 15 generates an indicator of whether there is interference in the first IF signal 120. In some implementations, a coupler 13 is used for diverting the first IF signal 120 into the combined RSL and interference detector 15.

The combined RSL and interference detector 15 includes a mixer 30, a pair of RSL filters (40, 50), and a RSL detector 60. In some implementations, the mixer 30 converts the first IF signal 120 into a third IF signal 140 that has a similar frequency like the second IF signal 130, i.e., 70-140 MHz. According to a predefined schedule, the RSL detector 60 switches to connect to the RSL filter 40 and the RSL filter 50, respectively. In this example, the RSL filter 40 is configured to have a first bandwidth (e.g., 5 MHz) and the RSL filter 50 is configured to have a second bandwidth (e.g., 56 MHz). Therefore, the signal output by the RSL filter 40 has a narrow bandwidth and includes only information from the desired channel whereas the signal output by the RSL filter 50 has a wide bandwidth and includes both information from the desired channel as well as potential interference.

In some implementations, assume that a remote transmitter is on and the receiver shown in FIG. 5 is to receive signals from the remote transmitter. The RSL detector 60 reports, to a radio management system (e.g., a computer equipped with necessary software not shown in the figure), a first set of measurements of the signal through the RSL filter 40 and a second set of measurements of the signal through the RSL filter 50. The radio management system then compares the two sets of measurements. If they are deemed to be the same, the radio management system determines that there is no interference in the signal received by the receiver. If they are deemed to be different, the radio management then determines that there is interference in the signal received by the receiver. The radio management system can further diagnose the problem by checking the BER reading to identify whether the inference has enough impact on the system performance or not.

In some implementations, by turning off the remote transmitter, the RSL detector 60 reports, to the radio management system, a third set of measurements of the signal through the RSL filter 40 and a fourth set of measurements of the signal through the RSL filter 50. The radio management system then compares the two sets of measurements. If they are deemed to be the same (e.g., zero reading) the radio management system determines that there is no interference in the signal received by the receiver. If they are deemed to be the same but not zero reading (i.e., the received signal level of the RSL filter 40 is not zero and the received signal level of the RSL filter 50 is not zero), the radio management then determines that there is interference within a predefined bandwidth (e.g., 7 MHz) in the signal received by the receiver. If they are deemed to be different (e.g., the received signal level of the RSL filter 40 is not zero and the received signal level of the RSL filter 50 is not zero but of a different value), the radio management then determines that there is interference in the signal received within the bandwidths of 7 MHz to 56 MHz by the receiver. If they are deemed to be different (e.g., the received signal level of the RSL filter 40 is zero but the received signal level of the RSL filter 50 is not zero), the radio management then determines that there is interference between the bandwidth of 7 MHz and that of 56 MHz in the signal received by the receiver.

In some implementations, the above-described methods and their variations may be implemented as computer software instructions or firmware instructions. Such instructions may be stored in an article with one or more machine-readable storage devices connected to one or more computers or integrated circuits or digital processors such as digital signal processors, microprocessors, or micro-control units (MCU), and the instructions may perform the combined RSL and interference detection. Other variations and enhancements are possible based on what is mentioned here.

The foregoing description, for purpose of explanation, has been described with reference to specific embodiments. However, the illustrative discussions above are not intended to be exhaustive or to limit the invention to the precise forms disclosed. For example, some of the components shown in FIGS. 1-4 may be optional and additional components may be helpful to enhance the performance of the receiver. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A microwave radio receiver, comprising:
   a first down-converter, wherein the first down-converter is configured to convert a RF signal into a first IF signal;
   a second down-converter, wherein the second down-converter is configured to convert the first IF signal into a second IF signal; and
   a combined receiver signal level (RSL) and interference detector, wherein the combined RSL and interference detector is configured to determine one or more RSLs and generate an interference indicator based on the first IF signal from the first down-converter and a control signal from the second down-converter, wherein the combined RSL and interference detector further includes a mixer, a narrow-bandwidth RSL filter, and a wide-bandwidth RSL filter.

2. The microwave radio receiver of claim 1, wherein the first down-converter further includes a mixer and a local oscillator, and the mixer is configured to convert the RF signal into the first IF signal under the control of the local oscillator.

3. The microwave radio receiver of claim 2, wherein the RF signal is pre-processed by one or more amplifiers and one or more filters before it reaches the mixer.

4. The microwave radio receiver of claim 2, wherein the local oscillator is configured to generate a control signal and the control signal is pre-processed by one or more multipliers and one or more amplifiers and one or more filters before it reaches the mixer.

5. The microwave radio receiver of claim 1, wherein the second down-converter further includes a mixer and a local oscillator, and the mixer is configured to convert the first IF signal into the second IF signal under the control of the local oscillator.

6. The microwave radio receiver of claim 5, wherein the first IF signal is pre-processed by one or more amplifiers and one or more filters before it reaches the mixer.

7. The microwave radio receiver of claim 5, wherein the local oscillator is configured to generate a control signal and the control signal is pre-processed by one or more amplifiers before it reaches the mixer.

8. The microwave radio receiver of claim 7, wherein the control signal provided to the combined RSL and interference detector is an amplified version of the control signal generated by the local oscillator.

9. The microwave radio receiver of claim 1, wherein the narrow-bandwidth RSL filter has a bandwidth of approximately 5 MHz and the wide-bandwidth RSL filter has a bandwidth of approximately 56 MHz, respectively.

10. The microwave radio receiver of claim 9, wherein the combined RSL and interference detector further includes a RSL detector, and the RSL detector is configured to switch to connect to the narrow-bandwidth RSL filter and the wide-bandwidth RSL filter, respectively, according to a predefined schedule.

11. The microwave radio receiver of claim 10, wherein the RSL detector is configured to determine a first receiver signal level when it is connected to the narrow-bandwidth RSL filter and determine a second receiver signal level when it is connected to the wide-bandwidth RSL filter.

12. The microwave radio receiver of claim 11, wherein a comparison result of the first receiver signal level and the second receiver signal level is used for generating a potential interference indicator.

13. The microwave radio receiver of claim 12, wherein the potential interference indicator is a bit error rate.

14. The microwave radio receiver of claim 1, wherein the mixer is configured to convert the first IF signal into a third IF signal in accordance with the control signal from the second down-converter and feed the third IF signal to the narrow-bandwidth RSL filter and wide-bandwidth RSL filter, respectively.

15. The microwave radio receiver of claim 1, wherein the RF signal has a frequency ranging from 6 GHz to 42 GHz.

16. The microwave radio receiver of claim 1, wherein the first IF signal has a frequency ranging from 1 GHz to 3 GHz.

17. The microwave radio receiver of claim 1, wherein the second IF signal has a frequency ranging from 70 MHz to 140 MHz.

18. A microwave radio receiver, comprising:
a first down-converter, wherein the first down-converter is configured to convert a RF signal into a first IF signal, wherein the first down-converter further includes a mixer and a local oscillator, and the mixer is configured to convert the RF signal into the first IF signal under the control of the local oscillator and the local oscillator is configured to generate a control signal and the control signal is pre-processed by one or more multipliers and one or more amplifiers and one or more filters before it reaches the mixer;
a second down-converter, wherein the second down-converter is configured to convert the first IF signal into a second IF signal; and
a combined receiver signal level (RSL) and interference detector, wherein the combined RSL and interference detector is configured to determine one or more RSLs and generate an interference indicator based on the first IF signal from the first down-converter and a control signal from the second down-converter.

19. A microwave radio receiver, comprising:
a first down-converter, wherein the first down-converter is configured to convert a RF signal into a first IF signal;
a second down-converter, wherein the second down-converter is configured to convert the first IF signal into a second IF signal, wherein the second down-converter further includes a mixer and a local oscillator, and the mixer is configured to convert the first IF signal into the second IF signal under the control of the local oscillator and the local oscillator is configured to generate a control signal and the control signal is pre-processed by one or more amplifiers before it reaches the mixer; and
a combined receiver signal level (RSL) and interference detector, wherein the combined RSL and interference detector is configured to determine one or more RSLs and generate an interference indicator based on the first IF signal from the first down-converter and a control signal from the second down-converter.

\* \* \* \* \*